(12) United States Patent
High et al.

(10) Patent No.: US 10,647,402 B2
(45) Date of Patent: May 12, 2020

(54) GAS-FILLED CARRIER AIRCRAFTS AND METHODS OF DISPERSING UNMANNED AIRCRAFT SYSTEMS IN DELIVERING PRODUCTS

(71) Applicant: Walmart Apollo, LLC, Bentonville, AR (US)

(72) Inventors: Donald R. High, Noel, MO (US); David C. Cox, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 525 days.

(21) Appl. No.: 15/427,277

(22) Filed: Feb. 8, 2017

(65) Prior Publication Data

US 2017/0233053 A1    Aug. 17, 2017

Related U.S. Application Data

(60) Provisional application No. 62/294,748, filed on Feb. 12, 2016.

(51) Int. Cl.
*B64B 1/02* (2006.01)
*B64B 1/06* (2006.01)
(Continued)

(52) U.S. Cl.
CPC ............ *B64B 1/02* (2013.01); *B64B 1/06* (2013.01); *B64C 39/024* (2013.01); *B64D 5/00* (2013.01);
(Continued)

(58) Field of Classification Search
CPC .... B64B 1/02; B64B 1/06; B64B 1/18; B64B 1/22; B64D 5/00
See application file for complete search history.

(56) References Cited

U.S. PATENT DOCUMENTS

| | | | | |
|---|---|---|---|---|
| 1,004,662 A | * | 10/1911 | Kuenzel | B64B 1/02 244/30 |
| 1,023,404 A | * | 4/1912 | Wymore | B64B 1/06 244/24 |

(Continued)

FOREIGN PATENT DOCUMENTS

WO    2014080386    4/2015

OTHER PUBLICATIONS

Atherton, Kelsey D.; "DARPA Wants Airborne Aircraft Carriers"; http://www.popsci.com/article/technology/darpa-wants-airborne-aircraft-carriers; Nov. 11, 2014; pp. 1-2.

(Continued)

*Primary Examiner* — Richard G Davis
(74) *Attorney, Agent, or Firm* — Fitch, Even, Tabin & Flannery LLP

(57) ABSTRACT

In some embodiments, apparatuses and methods are provided herein useful to transport unmanned aircraft systems to delivery products. In some embodiments, gas-filled aerial transport and launch system, comprises: a transport aircraft comprising: a gas chamber; and a carrier compartment where the gas chamber induces a lifting force on the carrier compartment; at least one propulsion system; and a navigation control system that controls the direction of travel of the transport aircraft; wherein the carrier compartment comprises: an unmanned aircraft system (UAS) storage area configured to receive multiple UASs; and an UAS launching bay that enables the UAS to be launched while the transport aircraft is in flight and while the UAS is carrying a package to be delivered.

20 Claims, 4 Drawing Sheets

(51) Int. Cl.
*B64C 39/02* (2006.01)
*B64D 5/00* (2006.01)
*G05D 1/00* (2006.01)
*G06Q 10/08* (2012.01)
*G08G 5/00* (2006.01)

(52) U.S. Cl.
CPC ....... *G05D 1/0027* (2013.01); *G06Q 10/0833* (2013.01); *G08G 5/0034* (2013.01); *G08G 5/0069* (2013.01); *B64C 2201/082* (2013.01); *B64C 2201/128* (2013.01); *B64C 2201/146* (2013.01); *B64C 2201/206* (2013.01)

(56) References Cited

U.S. PATENT DOCUMENTS

| | | | |
|---|---|---|---|
| 7,854,410 | B2 | 12/2010 | Fanucci |
| 7,900,866 | B2 | 3/2011 | Kutzmann |
| 9,132,916 | B2 | 9/2015 | Hanna |
| 9,305,280 | B1 * | 4/2016 | Berg ................ H04L 67/12 |
| 9,550,577 | B1 | 1/2017 | Beckman |
| 9,573,684 | B2 | 2/2017 | Kimchi |
| 2002/0072361 | A1 | 6/2002 | Knoblach |
| 2009/0108126 | A1 * | 4/2009 | Capuani ................ B64B 1/02 |
| | | | 244/25 |
| 2009/0224094 | A1 | 9/2009 | Lachenmeier |
| 2009/0294573 | A1 | 12/2009 | Wilson |
| 2014/0032034 | A1 | 1/2014 | Raptopoulos |
| 2015/0120094 | A1 | 4/2015 | Kimchi |
| 2015/0277440 | A1 | 10/2015 | Kimchi |
| 2015/0314871 | A1 | 11/2015 | von Flotow |
| 2016/0196755 | A1 | 7/2016 | Navot |
| 2016/0200438 | A1 | 7/2016 | Bokeno |
| 2016/0257401 | A1 * | 9/2016 | Buchmueller ........ B64C 39/024 |
| 2017/0038780 | A1 * | 2/2017 | Fandetti ................ G05D 1/104 |
| 2017/0110017 | A1 | 4/2017 | Kimchi |

OTHER PUBLICATIONS

Kumbroch, David; "WHNT News 19: UAH Students Create Drone Airship to Make Longer Drone Flight Possible"; http://whnt.com/2014/05/12/uah-students-create-drone-airship-to-make-longer-drone-flightpossible/; Posted May 12, 2014; 12 pages.

Miura, Ryu; "A Wireless Relay System Based on Small Unmanned Aircraft for Disaster Situations: Providing connections from the sky to isolated regions"; Retrieved from New Breeze, Summer 2014; pp. 4-5.

PCT; App. No. PCT/US2017/016801; International Search Report and Written Opinion dated Apr. 13, 2017.

* cited by examiner

GAS-FILLED CARRIER AIRCRAFTS AND METHODS OF DISPERSING UNMANNED AIRCRAFT SYSTEMS IN DELIVERING PRODUCTS

CROSS-REFERENCE TO RELATED APPLICATION

This application claims the benefit of U.S. Provisional Application No. 62/294,748, filed Feb. 12, 2016, which is incorporated herein by reference in its entirety.

TECHNICAL FIELD

This invention relates generally to a gas-filled carrier aircraft.

BACKGROUND

In a modern retail environment, there is a need to improve the customer service and/or convenience for the customer. One aspect of customer service is the availability of products. The availability of products is dependent in part on the distribution of products. There are numerous ways to distribute and deliver products. Getting the product to a delivery location, however, can cause undesirable delays, can add cost and reduce revenue.

BRIEF DESCRIPTION OF THE DRAWINGS

Disclosed herein are embodiments of systems, apparatuses and methods pertaining to gas-filled carrier aircrafts to transport unmanned aircraft systems. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses, methods and processes are provided illustrating a gas-filled aerial transport and launch system. The system includes a transport aircraft that comprises one or more gas chamber and a carrier compartment that is secured with the one or more gas chambers. One or more propulsion systems are cooperated with the gas chamber and/or the carrier compartment. When activated, the propulsion systems cause the transport aircraft to move through the air. The system further includes a navigation control system that controls the direction of travel of the transport aircraft. The carrier compartment includes an unmanned aircraft system (UAS) storage area configured to receive multiple UASs staged to be launched in delivering products. One or more UAS launching bays are included in the carrier compartment that enables the UASs to be launched while the transport aircraft is in flight and while UASs are carrying a product or package to be delivered to an intended corresponding delivery location that is within a UAS flight threshold from a location of the transport aircraft at the time the UAS is launched.

Figure 1:
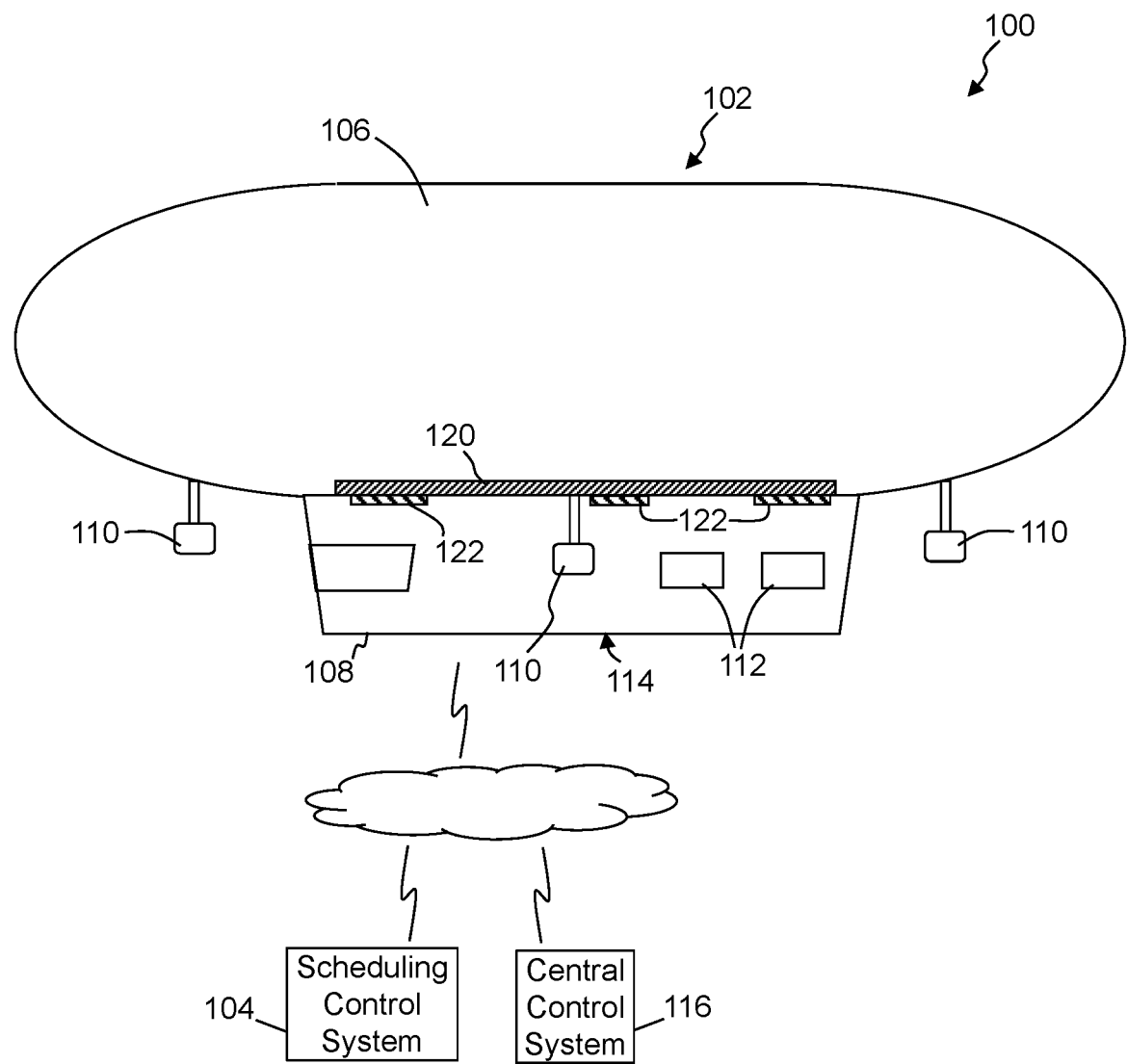
FIG. 1 illustrates a simplified side view of an exemplary gas-filled aerial transport and launch system, in accordance with some embodiments.
Figure 2:
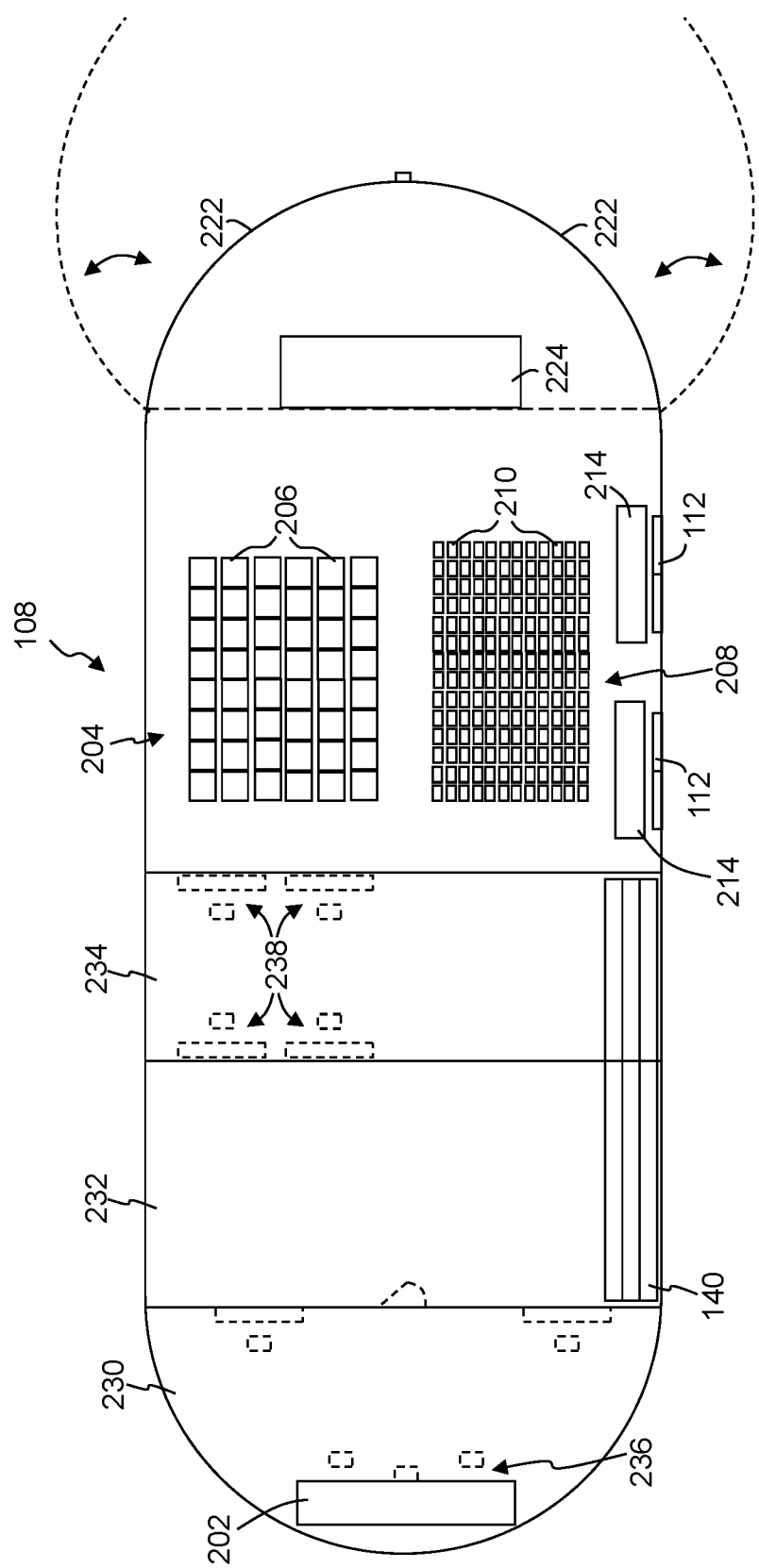
FIG. 2 illustrates a simplified overhead view of an exemplary carrier compartment, in accordance with some embodiments.

FIG. 1 illustrates a simplified side view of an exemplary gas-filled aerial transport and launch system 100, in accordance with some embodiments. FIG. 2 illustrates a simplified overhead view of an exemplary carrier compartment 108, in accordance with some embodiments. Referring to FIGS. 1-2, in some embodiments, the transport and launch system 100 include a transport aircraft 102 that includes and/or is in wireless (and sometimes wired) communication with a scheduling control system 104. The scheduling control system communicates at least delivery schedules corresponding to the launching of UASs from the transport aircraft 102. In some implementations, the scheduling control system may be remote from the transport aircraft (e.g., at a ground station, distributed over multiple ground locations, etc.), while in other implementations, some or all of the scheduling control system may be maintained on the transport aircraft.

The transport aircraft includes a gas chamber 106 and a carrier compartment 108 that is secured with the gas chamber. In some instances, the gas chamber includes multiple sub-chambers that are separate and maintained to provide added security and safety. The gas chamber and/or sub-chambers, when filled with a heated gas, helium, other relevant gas, or a combination of two or more of such gases, induces a lifting force on the carrier compartment 108. Typically, the lifting force is sufficient to allow the transport aircraft to fly at heights of greater than 500 feet, and typically at greater than 1000 feet.

One or more propulsion systems 110 are secured with the gas chamber and/or the carrier compartment. When activated, the propulsion system 110 causes the transport aircraft to move through the air. The propulsion systems may be configured to advance the transport aircraft upward, downward, in forward and/or reverse directions. In other instances, the control of the propulsion system may allow the transport aircraft to travel in substantially any direction. A navigation control system 202 provides control of the direction of travel and/or altitude of the transport aircraft 102. In some applications, the navigation control system in part couples with the one or more propulsion systems to control the direction of travel and/or altitude. The propulsion system may include one or more motors, propellers, electrical power sources, and the like. Further, the propellers may be tilted and/or rotated to aid in controlling the direction of travel. Similarly, when multiple propeller systems are included, the navigation system may independently control the propeller systems to control the direction of travel, elevation, tilt and other such control of the transport aircraft. Additionally or alternatively, the navigation system may include and/or couple with one or more rudders, flaps, ailerons, stabilizers, elevators, wings, and/or other such structures to aid in controlling the direction of travel and/or altitude.

The navigation control system 202 may operate autonomously and implement commands that are preprogrammed and/or wirelessly received from the remote scheduling control system 104, central control system 116, and/or other source. In other implementations, some or all of the control implemented through the navigation control system is received through one or more crew workers on the transport aircraft 102. The navigation control system may include pilot controls 236 that allow a pilot, and in some instances a co-pilot, to operate and control the transport aircraft. Further controls may allow an engineer and/or navigator to also be on the transport aircraft and providing control inputs to the navigation control system, and/or to the pilot or co-pilot to be used by the pilot or co-pilot in controlling the transport aircraft. In some instance, the transport aircraft 102 includes a flight deck 230 where the pilot, co-pilot, engineer and/or navigator can be positioned while operating and/or controlling the transport aircraft. When a crew is used, the flight deck may include a door that is approved by the U.S. Federal Aviation Administration (FAA) and/or other such regulatory body.

The transport aircraft may further include a rest area 232 where additional crew may rest while awaiting a work shift, and where crew may rest after or between shifts. The rest area may include bunks, food, kitchen, head, and/or other such options. In some embodiments, the transport aircraft further includes a UAS control area 234 where one or more UAS pilots may be stationed with UAS pilot controls 238 to allow the UAS pilots to remotely communicate with, track, and/or control the UASs prior to, during and/or after flight. Again, multiple UAS pilots may be on the transport aircraft to allow the UAS pilots to operate in shifts. Further, one or more UAS loading workers may be stationed on a transport aircraft. The UAS loading workers can cooperate packages 210 with UASs 206 when needed, manage retrieved UASs, manage packages, and the like.

In some embodiments, however, one or more of the flight deck, rest area, and UAS control area may not be included. For example, the flight deck may not be included, with the navigation control system 202 autonomously controlling the flight of the transport aircraft and/or when remote pilots are in wireless communication with the navigation control system and have at least some control over the transport aircraft. Similarly, the UAS pilots may be remote from the transport aircraft, such as in a remote location at one of one or more ground bases or facilities. The UAS pilot control systems operated by UAS pilots are in wireless communication with the UASs, which may be relayed through a communication system of the transport aircraft (e.g., providing a Wi-Fi network on the transport aircraft, the transport aircraft operating as a base station for cellular communication, etc.). Further, the transport aircraft may not carry UAS loading workers. In some instances, the UASs are loaded onto the transport aircraft with packages already cooperated with the UASs. Additionally or alternatively, the transport aircraft may include a package attaching system that automates the retrieval and/or cooperation of packages with available UASs, typically without worker interaction. Accordingly, the rest area may also not be included when there are no workers on the transport aircraft.

The carrier compartment includes a cargo area with a UAS storage area 204 that receives and houses multiple UASs 206 staged to be launched in delivering packages, which may include one or more products. The cargo area further includes a package storage area 208 that receives and houses products and/or packages 210 of one or more products to be delivered. In some instances, the UASs may be loaded into the UAS storage area separate from the packages, with the packages subsequently cooperated with a UAS at a time prior to the UAS being launched to deliver the package. In other instances, some or all of the UASs may be loaded into the UAS storage area 204 with one or more packages 210 previously secured with the UASs 206. Further, additional packages 210 may be loaded into the package storage area even when the UASs are loaded into the cargo area with packages previously secured with the UASs. This allows one or more UASs to return to the transport aircraft and have another package subsequently secured with the UASs for subsequent delivery.

The carrier compartment 108 further includes at least one, and often multiple UAS launching bays 112, doors, windows, or the like that enables the UASs to at least be launched while the transport aircraft 102 is in flight and while the UASs are carrying packages to be delivered to an intended corresponding delivery locations that are within a UAS flight threshold from a location of the transport aircraft at the time each UAS is launched. The launching bay doors may further be utilized in the retrieval of UASs returning from a delivery. For example, the UASs may fly into the carrier compartment and land in the staging area 214. In other instances, different bay be designated for UAS retrieval versus launching. The UAS flight threshold may be different for different UASs, and/or may depend on one or more factors such as, but not limited to, a size and/or weight of one or more packages being delivered by a UAS, wind speed, direction of wind relative to an intended flight path, stored power level of one or more battery sources of the UAS, rate of power consumption, fuel levels of a UAS (when operated using a combustible fuel), a flight path or route of the transport aircraft 102, other such factors, and often a combination of two or more of such factors.

The carrier compartment may further include one or more loading doors 222 and/or loading ramps 224. The loading doors can be opened to allow UASs 206 and/or packages 210 into the carrier compartment. In some applications, one or more loading doors may open in such a way to form a loading ramp. The loading ramp may be configured to allow forklifts and/or other vehicles, pallet jacks, and/or other systems to move packages and/or UASs into and/or out of the carrier compartment 108. In some instances, multiple UASs are staged on racks that can be transported to the transport aircraft and secured within the carrier compartment. Similarly, multiple package racks can be loaded with packages to be delivered, the loaded package racks can be transported to and secured within the carrier compartment. The carrier compartment may have rack couplers that secure each of the racks into one of multiple rack locations. The UAS racks and/or package racks can simplify the loading and/or speed the loading in some instances.

In some applications, the carrier compartment further includes one or more launch staging areas 214 within an interior of the carrier compartment 108. Typically the launch staging areas are positioned proximate one or more of the launching bays 112. Prior to being launched the UASs 206 may be positioned at the launch staging area. In some embodiments, the UASs are activated to start their motors to start flying while within the carrier compartment and fly out of one of the launching bays 112. In other instances, a launching system is included that propels and/or drops the UASs from a launching bay. For example, a UAS catapult, rail system, or the like may be positioned at a launch staging area and UASs can be catapulted or otherwise launched out of a launching bay in response to a launch command consistent with a flight path of the UAS being launched and a current location of the transport aircraft. In other implementations, the UASs may be cooperated with a crane system that lowers the UASs away from the transport aircraft at least a threshold distance before releasing the UASs. In some embodiments, one or more of the launching bays 112 may be positioned so that the UASs are dropped out of a bottom or floor 114 of the carrier compartment. For example, a mechanical arm, crane system, or the like may support a UAS over a launching bay and/or drop shoot leading to the launching bay, and releases the UAS to drop down out of the launching bay. One or more alternative bays are included to retrieve the UASs that return to the transport aircraft. Typically, when a UAS is launched, the UAS is activated with motors operating so that when it is outside side of the carrier compartment control of the UAS's flight can be controlled. In other instances, however, the UAS may be launched without the motors active, for example so that the UAS drops away from the transport aircraft before the motors and/or propellers of the UAS are activated. Similarly, in some embodiments, a slide may be cooperated with a launching bay with UASs being slide down the slide to exit the carrier compartment as part of a launching process. Further, the slide may be positioned to extend out of the launching bay and away from the carrier compartment such the UASs slide along the slide a distance from the carrier compartment.

In some embodiments, one or more pilots can optionally be in wireless communication with the UASs and provide at least some control of the flight of the UASs. The pilots may be on the transport aircraft and/or at one or more remote locations separate from the transport aircraft. UASs 206 can each include one or more wireless transceivers and a flight control circuit. A pilot can establish a communication link with a UAS and communicate flight control commands that are received by the UAS through the transceiver. The communication may be via cellular, Wi-Fi through a transceiver on the transport aircraft, satellite communication, other such wireless communication, or combination of two or more of such communication methods. The flight control circuit can implement flight control commands received from the remote pilot to control the flight of the UAS. In some instances, the remote pilot issues flight control commands in activating the motors of the UAS and/or in flying the UAS out of the launching bay 112. In other applications, the remote pilot may merely be on standby to takes over control in the event of predefined conditions occurring (e.g., proximity sensors indicating the UAS is within threshold of something, loss of power to one or more motors, unexpected change in altitude, loss of orientation, or other such conditions). In those instances, where the remote pilot controls the UAS while launching the UAS, the pilot typically later relinquishes control of the UAS to allow the UAS to take over control in controlling the flight of the UAS, such as in response to a release from the remote pilot, to allow the flight control circuit implement a predefined flight path in delivering a package cooperated with the UAS.

Typically, the UAS communicates information back to the remote pilot to provide the pilot with feedback and allow the pilot to control the UAS. The communication can include communicating video content captured by one or more cameras on the UAS, altitude information, distance information measured by distance measurement systems to identify distances of objects from the UAS, speed of travel, operating conditions of one or more motors and/or propellers (e.g., revolutions per minute, power levels, etc.), location information (e.g., global positioning information), other such information, and typically a combination of two or more of such information. This information may additionally or alternatively be communicated to a central control system 116 and/or the scheduling control system, and accessed by the remote pilot. Further, this information may continue to be communicated to the remote pilot or central control system while the UAS is active. This allows the system to track the UAS, log relevant information, maintain statistics on one or more UASs, track UASs for maintenance, and other such information. Similarly, the information may be available to a remote pilot in the event an issue occurs and a pilot needs to take over at least some control of the UAS.

In some applications, the UASs operate independent of a remote pilot in delivering a package. In other applications, however, a remote pilot may be notified when a UAS is within a threshold distance of a delivery location to allow the pilot to monitor the delivery and/or take over control of the delivery. Similarly, the UAS may operate independent of a remote pilot in returning and/or retrieving the UAS to the transport aircraft after completing a delivery while the transport aircraft in still in flight (e.g., flying along a predefined flight path, maintaining a relatively fixed position, etc.). The UAS return along a return flight path, which may be based in part on a predefined flight path of the transport aircraft 102, a distance traveled by the UAS, and a time the UAS was away from the transport aircraft. In some instances, the UAS may receive communications from the transport aircraft and/or a central control system regarding a location of the transport aircraft (e.g., global positioning information) and/or other relevant information (e.g., direction of travel, speed, altitude, etc.), which can be used by the UAS flight control circuit in adjusting a flight path to intercept and return to the transport aircraft. Alternatively or additionally, the location information and other relevant information for the transport aircraft and the UAS may be communicated to the central control system to determine adjustments to a flight path of the UAS, and communicate the adjustments and/or a revised flight path to be implemented by the UAS.

In some implementations, the return flight path of the UAS may include returning the UAS to a wait location. The flight control circuit of each UAS can control the flight of the UAS in implementing the flight path to one of a plurality of predefined wait locations after delivery of the package. At the wait location, the UAS can wait for the transport aircraft 102 to be within a threshold distance from the UAS prior to attempting to return to the transport aircraft. In other instances, the UAS may wait at the wait location awaiting a remote pilot to take over flight control of the UAS to complete the flight of the UAS in returning the UAS to the transport aircraft. The predefined wait locations can be defined at a threshold distance from a flight path of the transport aircraft. Further, the selection of the predefined wait locations can be determined based on the transport aircraft flight path, locations of one or more delivery locations, potential air traffic, other such factors, and typically a combination of such factors. For example, a single wait location may be selected that multiple different UASs return to and enter a queue to await each UAS's turn to return to the transport aircraft. The queue may be established by communication between the transport aircraft and the multiple UAS, between the UAS and the central control system 116, between the central control system and the transport aircraft, direct communication between UASs, other such communication, or a combination of two or more of such communications. Further, the wait locations are often defined in the air such that the UASs do not have to land to await the transport aircraft. In other instances, however, one or more wait locations may be defined on top of buildings, water towers, or other structures allowing the UASs to land to await the transport aircraft. This can save power on the UAS and/or the wait locations may have charging stations that can provide a charge to the UAS while waiting. In some instances, a UAS may be rerouted to a different wait location where the UAS may be able to land based on an expected time the UAS would otherwise have to hover, power levels of a UAS, other conditions of the UAS, and/or other such factors.

As introduced above, in some implementations the transport aircraft may travel along a predefined path or paths. The navigation control system 202 controls the flight of the transport aircraft to fly along a predefined flight path. The flight path of the transport aircraft can be determined based on delivery locations corresponding to each of the packages and flight ranges of corresponding of the UASs as the UASs launch and return to the transport aircraft in delivering packages. Similarly, one or more flight paths may be defined to transport the UASs and/or packages to a remote location prior to deployment and delivery. Further, the transport aircraft flight path may keep the transport aircraft in a predefined area to be ready to deploy a UAS to deliver a package in response to receiving an order for a product. For example, the transport aircraft may store one or more types of preselected products 210 that have not yet been sold and based on expected sales of those preselected products. The transport aircraft may additionally store products that have already been ordered and/or purchased. The flight path of the transport aircraft can maintain the aircraft above a geographic area where it is expected some of the preselected products will be ordered (e.g., the flight path can cause the transport aircraft to continue in a loop pattern above at least a portion of a metropolitan area). In response to receiving a notification that a preselected product, the scheduling control system 104 can notify a worker in the carrier compartment and/or a product loading system to cooperate a package with the ordered product to a UAS as the transport aircraft approaches a delivery location that is within a threshold distance of the flight path of the transport aircraft. Additionally or alternatively, the flight path of the transport airship may be adjusted based on the ordered product to put the transport airship within a threshold distance (e.g., based on flight range of a UAS) of the delivery location, while still staying generally within a geographic area and/or within a threshold distance of a geographic area. Further, a geographic area may be subdivided into multiple geographic sub-areas, with one or more transport aircrafts associated with each sub-area.

Further, the transport aircraft can be resupplied and/or provided additional products to allow for rapid and/or same day deliver. In resupply at transport aircraft, one or more ordered products can be packaged up (e.g., at a warehouse, distribution center, fulfillment center, retail shopping facility, etc.), and attached to a UAS that can be launched to fly to the transport aircraft. The same UAS or a different UAS can subsequently be launched from the carrier aircraft when within a flight range of the delivery location to deliver the package. In some instances, the use of the transport aircraft allows flight paths to be predetermined (e.g., low-to-high and high-to-low).

In some implementations, the transport airship may be routed to fly over a long distance to a destination area where multiple deliveries are to be performed. The destination area can be substantially any size, and may be relatively large when deliveries are to a rural area. The routing of the transport airship over long distances can reduce costs of shipping and distribution of products because the transport airship can carry relatively large loads of products, and often more than multiple semi-trucks. Further, the flight path of the transport airship can provide for a more direct route to the destination area because the transport airship is not restricted to traveling on roads, which can further reduce costs of transport and improve speeds of transport. Similarly, the reduced distances and/or travel times can reduced fuel consumption and/or in many instances the transport aircraft uses electrical power, which can provide for a reduced carbon footprint. The transport aircraft flight path typically further takes into consideration and/or routes around obstructions (e.g., buildings, mountains, etc.) and/other flight restrictions (e.g., restricted airspace, etc.).

In some embodiments, the carrier compartment may be removably cooperated with the gas chamber 106 so that the carrier compartment can be readily detached and reattached. The decoupling of the carrier compartment from the gas chamber, in part, enables a carrier compartment preloaded with UASs and/or packages to be readily cooperated with a gas chamber, and subsequently decoupled when the packages are delivered, when power levels and/or fuel are below a threshold, or other such reason. Upon decoupling of a first carrier compartment, a subsequent preloaded carrier compartment can be coupled to the gas chamber allowing the transport aircraft to quickly return to the sky and continue enabling packages to be delivered. In some embodiments, the gas chamber 106 includes one or more carrier mountings 120 that are configured to securable couple with one or more coupling systems 122 of a carrier compartment 108. For example, the carrier compartment may include one or more portable electrical power sources 140 (e.g., batteries, capacitors, generators, etc.) that can be charged at a ground station. The power sources can supply power to the one or more propulsion systems 110. When power levels in the power sources drop to threshold levels, the transport aircraft 102 can return to the ground station where the carrier compartment can be removed from the gas chamber, and a different carrier compartment with charged power sources can be coupled with the gas chamber. In some instances, one or more carrier mountings 120 and one or more coupling systems 122 can include an electrical connection such that when coupled electrical power may be transferred between the gas chamber 106, propulsion system 110, and/or the carrier compartment. Similarly, a communication connection may be included in one or more of the carrier mountings and the coupling systems to enable direct wired communication between the gas chamber, propulsion system and the carrier compartment. Further, in some implementations, the gas chamber and/or the carrier compartment may include solar panels that generate electricity that can be used to recharge one or more power sources. The electrical connection between the carrier mounting and the coupling system can enable the transfer of power to charge the rechargeable power source.

Figure 3:
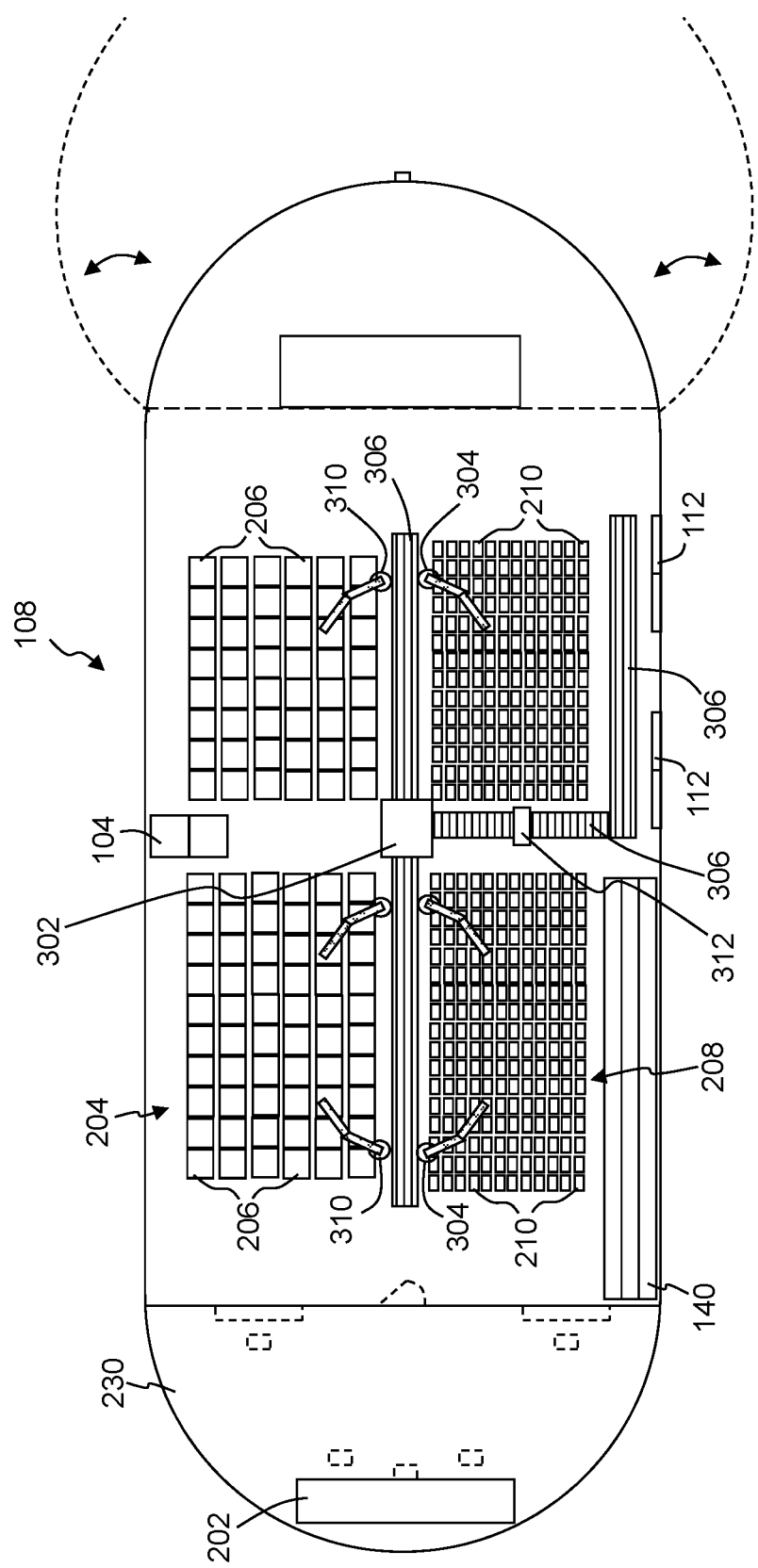
FIG. 3 illustrates a simplified overhead view of an exemplary carrier compartment, in accordance with some embodiments.

FIG. 3 illustrates a simplified overhead view of an exemplary carrier compartment 108, in accordance with some embodiments. As described above, in some embodiments, the carrier compartment may include a package attaching system 302. The package attaching system is configured to receive one or more packages and attach at least one package with each UAS prior to each UAS being launched from the transport aircraft 102. The attaching system may comprise a mechanical arm controlled by an attaching controller, where the mechanical arm acquires the package and lifts it into a coupler on the UAS such that the coupler secures the package with the UAS. In some instances, the package attaching system maintains a package in a fixed position and lowers a UAS onto the package such that a couplers of the UAS secures the package with the UAS. In some implementations, the package includes one or more coupling rods, and the package attaching system guides a coupling end of each coupling rod into a corresponding one of one or more slot of a quick release plate cooperated with the UAS. Other package attaching systems may additionally or alternatively be included. Further, some embodiments may include multiple types of package attaching systems to be utilized depending on a type of package, UAS and/or coupling system.

Further, some embodiments include a package storage system and/or package retrieval system 304. The package retrieval system is positioned within and/or proximate the package storage area 208, and configured to retrieve packages in preparation for delivery by UAS. The package retrieval system may, in some applications, include a mechanical arm that can move to select a desired package. The scheduling control system 104 may communicate a package identifier and/or a location within the package storage area and/or within a package storage system. The mechanical arm can be activated to retrieve that intended package. Additionally or alternatively, the package retrieval system may include an array of screw rods upon which packages are supported. The package retrieval system can activate a corresponding motor to rotate a particular screw rod, and as it rotates a package can be guided off an end of the screw support. The mechanical arm may grasp the package prior to or after being released from the screw rod. Some embodiments may additionally or alternatively include one or more conveyor systems 306 that can receive the package from the mechanical arm or as the package is released from a screw rod. The conveyor system and/or the mechanical arm may transport the package to the package attaching system 302 to allow the retrieved package to be cooperated with a UAS.

Some embodiments may additionally or alternatively include a UAS storage system and/or UAS retrieval system 310. The UAS retrieval system is positioned within and/or proximate the UAS storage area 204, and configured to retrieve UASs in preparation for launching the UASs. The UAS retrieval system 310 may, in some applications, include a mechanical arm that can move to select a desired UAS. The scheduling control system 104 may communicate a UAS identifier and/or a location within the UAS storage area and/or within a UAS storage system. The UAS selected area may be dependent on the package to be delivered (e.g., based on size of the package, shape of the package, distance the package has to be transported, etc.) and the corresponding capabilities of the UAS (e.g., lifting force, package coupler, flight range, etc.), when the transport aircraft carries different types of UASs. The mechanical arm can be activated to retrieve that intended UAS. Additionally or alternatively, the UAS retrieval system may include an array of screw rods upon which UASs are supported. The UAS retrieval system can activate a corresponding motor to rotate a particular screw rod, and as it rotates a UAS can be guided off an end of the screw support. The mechanical arm may grasp the UAS prior to or after being released from the screw rod. Some embodiments may additionally or alternatively include the one or more conveyor systems 306 that can receive the UAS from the mechanical arm or as the UAS is released from a screw rod. The conveyor system and/or the mechanical arm may transport the UAS to the package attaching system 302 to allow a package to be cooperated with the retrieved UAS.

The conveyor system 306 comprise one or more conveyors. The conveyor system may transport packages and/or UASs to the launch staging area 214. Additionally or alternatively, the conveyor system may be part of the package and/or UAS retrieval systems to transport packages and/or UASs to the launch staging area and/or the package attaching system 302. Further, the conveyor system may transport UASs with a package cooperated to the launch staging area 214 proximate the launching bays and/or a launching system.

Some embodiments further include at least one package identifier system and/or UAS identifier system 312 that is positioned within the cargo area of the carrier compartment and configured to detect a package identifier and/or a UAS identifier. In some implementations, the package/UAS identifier is positioned to detect an identifier of a package and a UAS with which the package is being cooperated. For example, the package/UAS identifier may be positioned proximate a conveyor system 306, part of a package retrieval system 304, part of a package storage system, part of the UAS retrieval system, or the like. Alternatively or additionally, workers loading the packages may manually scan packages and/or UASs as they are loaded into the carrier compartment. The package/UAS identifier system may utilize RFID scanners, optical bar code scanners, image processing, text capture, and/or other such methods of identifying a package and/or labeling on a package.

The identification of the package can be used to determine a delivery location and/or a flight path of the UAS to carry the package. For example, a flight path system, the navigation control system 202 and/or the scheduling control system 104 may receive the package identifier, retrieve delivery location information, and determine a flight path of the UAS. Typically, the flight path of the UAS is determined as a function of the location of the transport aircraft 102 and/or the intended flight path of the transport aircraft. Further considerations in determining the flight path of the UAS may include, but are not limited to, flight capabilities of the UAS to carry the package, weather conditions, whether there is a storage locker into which the package is to be deposited, other such factors, and often a combination of two or more of such factors. The flight path can be communicated to the navigation control system, and/or the UAS carrying the package. In some instances, based on the package identifier a flight path that each UAS is to travel in delivering each package is obtained. These flight paths can further be caused to be communicated to each of corresponding UASs with which each package is cooperated.

Some embodiments may further use the package identifier in scheduling the delivery, postponing the delivery and/or aborting the delivery. For example, the package delivery may be postponed when a delivery location is unavailable. The package identifier system 312 can be positioned to detect a package identifier of each package to be delivered. Based on the identification of the package, a delivery location associated with each package can be identified. Some embodiments may further evaluate the location to determine whether the delivery location is unavailable. For example, the specified delivery location may be to a locker on the top of a building or other location, and the locker may not have space available to receive the package (e.g., one or more other packages may already be in the locker). As another example, a delivery location may also correspond to receiving a confirmation from a human that the package was received (e.g., when delivering prescription medication, alcohol, and other products), and the scheduling control system may be unable to confirm that an authorized person is available at the delivery location to confirm receipt of the product. Accordingly, the scheduling control system may determine, based on the package identifier, that the package should not be delivered, and communicate a postpone command. The identified package can then be temporarily skipped in a sequence of cooperating each of the packages with one of the multiple UASs when the delivery location associated with the first package is unavailable.

Figure 4:
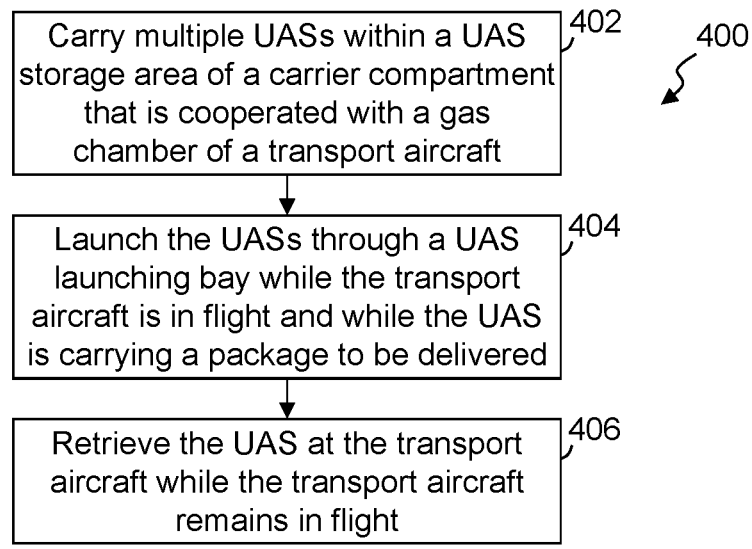
FIG. 4 illustrates a simplified flow diagram of an exemplary process of aerially transporting and launching unmanned aircraft systems, in accordance with some embodiments.

FIG. 4 illustrates a simplified flow diagram of an exemplary process 400 of aerially transporting and launching UASs, in accordance with some embodiments. In step 402, multiple UASs are carried within a UAS storage area 204 of a carrier compartment 108 that is cooperated with a gas chamber 106 of a transport aircraft 102. The gas chamber is configured to receive one or more gases to induce a lifting force and carry the carrier compartment in flight. In some applications the gas chamber may include multiple sub-chambers. At least some of the sub-chambers can be maintained by separate systems to ensure sufficient lift force in the event of a failure of a threshold number of sub-chambers. In some embodiments, the transport aircraft 102 can be prepared for deliveries, in part, by removably cooperating a coupling system 122 of the carrier compartment 108 with a corresponding carrier mounting 120 of the gas chamber 106 and removably coupling the carrier compartment with the gas chamber.

In step 404, each of the multiple UASs are launched while the transport aircraft is in flight and while each of the UASs is carrying one or more packages and/or products to be delivered to an intended corresponding delivery location that is within a UAS flight threshold from a location of the transport aircraft at the time the UAS is launched. Typically, the UAS are launched from one or more UAS launching bay 112. In some implementations, the UAS are flown out of the launching bay. The UASs can be positioned at a launch staging area within an interior of the carrier compartment and proximate the launching bay. Once motors are activated, the UASs can fly out of a corresponding launching bay. In some instances, a remote pilot may control the flight of one or more of the UASs during flight. For example, a UAS pilot may control a UAS during launch and/or retrieval. The UASs can each include one or more wireless transceivers to wirelessly receive flight control commands from a remote UAS pilot. A flight control circuit of the UAS can implement the flight control commands in flying the UAS, such as flying the UAS out of a launching bay. In some implementations, each UAS further receives a release command from the remote pilot. In response to receiving the release command, the flight control circuit implements a flight path as the flight control circuit takes over control in controlling the flight of the UAS in delivering a package cooperated with the UAS.

Some embodiments further include step 406, where one or more of the launched UASs are retrieved at the transport aircraft 102 while the transport aircraft remains in flight. In some instances, the UASs fly directly into the transport aircraft, such as through one of the launching bay 112 or separate retrieval bays, captured by a latching system, or other such methods. The UASs may, in some embodiments, have programing and/or a flight path directing the UAS to a wait location. The flight control circuits of each of the UAS control the flight of the UASs in implementing a corresponding flight path to fly to one of a plurality of wait locations after delivering a package to await the transport aircraft to be within a threshold distance, wait in a queue with other UAS, wait for a remote pilot to take over flight control of the UAS to return to the UAS to the transport aircraft, or other such reasons. In some embodiments, the flight of the transport aircraft is controlled to fly along a predefined flight path determined based on delivery locations corresponding to each of the packages and flight ranges of corresponding of the UASs as the UASs launch and return to the transport aircraft in delivering packages.

The carrier compartment in some instances may include a package attaching system. Packages can automatically be retrieved from a package storage area of the carrier compartment and automatically attached with a UAS prior to the UAS being launched. Further, some embodiments include package identifier system to detect a package identifier of each package cooperated with a UAS. Based on the package identifier, a flight path can be obtained that each UAS is to travel in delivering each package. A control system can cause each of the flight paths to be communicated to a corresponding one of the UASs with which each package is cooperated. Additionally, in some instances, a package identifier can be detected of each package to be cooperated with a UAS. Based on the identified package, a scheduling control system can identify that a delivery location associated with a package is unavailable. The scheduling control circuit can issue instructions that the package be temporarily skipped in a sequence of cooperating each of the packages with one of the multiple UASs when the delivery location associated with the package is unavailable.

Figure 5:
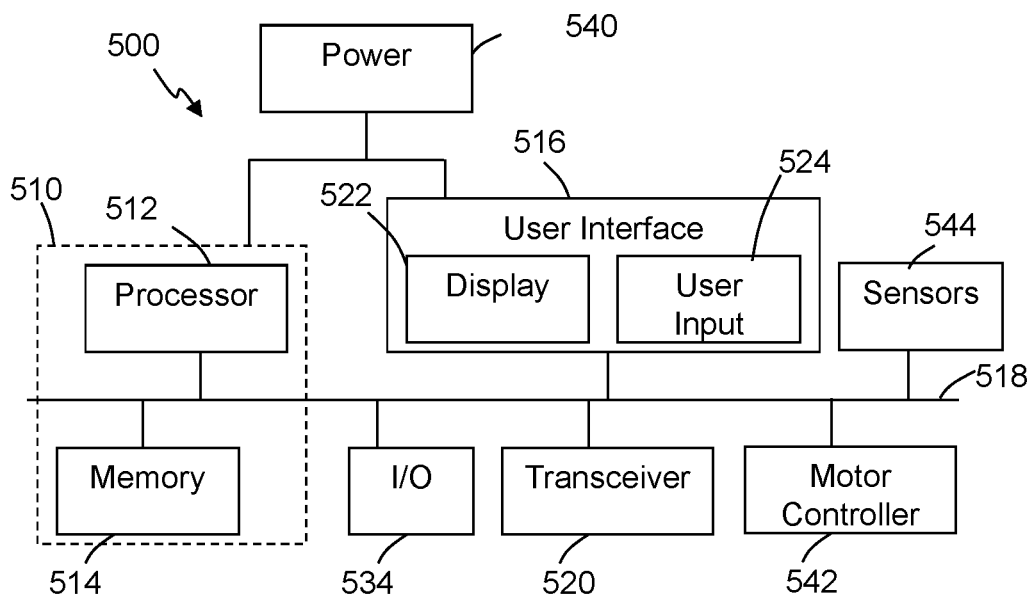
FIG. 5 illustrates an exemplary system for use in implementing methods, processes, techniques, devices, apparatuses, systems, servers, sources and the like in distributing products in accordance with some embodiments.

Further, the processes, methods, techniques, circuits, circuitry, systems, devices, functionality, services, servers, sources and the like described herein may be utilized, implemented and/or run on many different types of devices and/or systems. Referring to FIG. 5, there is illustrated an exemplary system 500 that may be used for any such implementations, in accordance with some embodiments. One or more components of the system 500 may be used for implementing any circuitry, system, functionality, apparatus, process, or device mentioned above or below, or parts of such circuitry, functionality, systems, apparatuses, processes, or devices, such as for example any of the above or below mentioned scheduling control system 104, central control system 116, navigation control system 202, pilot controls 236, UAS pilot controls 238, UAS 206, UAS flight control circuit, package attaching system 302, package storage system and/or package retrieval system 304, conveyor systems 306, UAS storage system and/or UAS retrieval system 310, UAS launching system, package identifier system 312, mechanical arm and/or controllers, inventory system, user interface units, and/or other such circuitry, functionality and/or devices. However, the use of the system 500 or any portion thereof is certainly not required.

By way of example, the system 500 may comprise a controller circuit or processor module 510, memory 514, and one or more communication links, paths, buses or the like 518. Some embodiments may include one or more user interfaces 516, one or more power sources or supplies 540, one or more motor controllers 542 and/or motors, and one or more sensors 544. The controller circuit 512 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, programs, content, listings, services, interfaces, logging, reporting, etc. Further, in some embodiments, the controller circuit 512 can be part of control circuitry and/or a control system 510, which may be implemented through one or more processors with access to one or more memory 514, which can store code that is implemented by the controller circuit and/or processors to implement intended functionality. In some applications, the controller circuit and/or memory may be distributed over a communications network (e.g., LAN, WAN, Internet) providing distributed and/or redundant processing and functionality. The user interface 516 can allow a user to interact with the system 500 and receive information through the system. In some instances, the user interface 516 includes a display 522 and/or one or more user inputs 524, such as a buttons, touch screen, track ball, keyboard, mouse, etc., which can be part of or wired or wirelessly coupled with the system 500.

Typically, the system 500 further includes one or more communication interfaces, ports, transceivers 520 and the like allowing the system 500 to communicate over a communication bus, a distributed communication network (e.g., a local network, the Internet, WAN, etc.), communication link 518, other networks or communication channels with other devices and/or other such communications or combinations thereof. Further the transceiver 520 can be configured for wired, wireless, optical, fiber optical cable, satellite, or other such communications configurations or combinations of two or more of such communications. Some embodiments include one or more input/output (I/O) ports 534 that allow one or more devices to couple with the system 500. The I/O ports can be substantially any relevant port or combinations of ports, such as but not limited to USB, Ethernet, or other such ports.

The system 500 comprises an example of a control and/or processor-based system with the controller circuit 512. Again, the controller circuit 512 can be implemented through one or more processors, controllers, central processing units, logic, software and the like. Further, in some implementations the controller circuit 512 may provide multiprocessor functionality.

The memory 514, which can be accessed by the controller circuit 512, typically includes one or more processor readable and/or computer readable media accessed by at least the controller circuit 512, and can include volatile and/or non-volatile media, such as RAM, ROM, EEPROM, flash memory and/or other memory technology. Further, the memory 514 is shown as internal to the system 510; however, the memory 514 can be internal, external or a combination of internal and external memory. Similarly, some or all of the memory 514 can be internal, external or a combination of internal and external memory of the controller circuit 512. The external memory can be substantially any relevant memory such as, but not limited to, one or more of flash memory secure digital (SD) card, universal serial bus (USB) stick or drive, other memory cards, hard drive and other such memory or combinations of such memory. The memory 514 can store code, software, executables, scripts, data, content, lists, programming, programs, log or history data, user information and the like.

In some applications, the transport aircraft 102 and the UASs 206 can be utilized, in part, to improve delivery accuracy and/or speed. A consumer can place an order for one or more products. In some instances, the customer may further specify a delivery location or landing zone. In other instances, an order system and/or the scheduling control system may determine a delivery location (e.g., based on a known address of the customer). The scheduling control system 104 and/or the central control system 116 can identify a transport aircraft corresponding to the delivery location and/or optimize a flight path for a transport aircraft. Similarly, the scheduling control system 104 and/or the central control system 116 can determine a flight path and/or launch location of a UAS relative to the flight path of the transport aircraft and the delivery location. Again, the UAS flight paths and return flight paths correlate with and/or are dependent on the flight path of the transport aircraft.

The transport aircraft 102 can be stocked by workers with packages, which typically contain one or more products, and UASs at a warehouse, distribution center, ground station, or the like. The transport aircraft can dock at the warehouse/distribution center while the carrier compartment is loaded and/or a carrier compartment is secured with the gas chamber 106.

Again, the UASs may be pre-coupled with packages prior to being loaded into the carrier compartment. Further, in some instances, packages can be cooperated with UASs while the transport aircraft is in flight. The UASs are staged to be launched. In some instances, a worker may place the UAS at a staging area. Additionally or alternatively, workers and/or an automated routing system (e.g., a conveyor system) may place the UAS and package on a rail system, catapult, crane system, or the like that is proximate a launching bay 112. The placement and/or orientation of the launching bay and/or launching systems can depend on the design of the carrier compartment, the intended method of launch, the capabilities of the UAS, and/or other such factors. In some instances, the launching bays may be at a back of the carrier compartment. One or more launching bays may addition or alternatively be arranged along one or more sides of the carrier compartment, a floor of the carrier compartment, or other such orientation.

At the time of launch, the UAS may be launched while the motors are active, while in other instances the motors may be activated after launch (e.g., the UAS is activated once sensors recognizes the UAS is a threshold distance away from transport aircraft). For example, the UAS can static drop while connected with a crane system while still connected to transport aircraft. In some instances, the crane system can includes a maneuverable arm that can move the UAS out of a launch bay before the crane system reels out the string, cable, etc. The UAS can be secured with the cable through an electronic latching mechanism that can be activated by a launch control circuit. When the UAS is a threshold distance from the transport aircraft the latching mechanism can be activated to release the UAS. In some instances, when the UAS is a threshold distance from the transport aircraft the UAS can activate the motors and stabilize in the air. Once the UAS is stabilized, the latch mechanism can be activated (e.g., by the UAS, a control system on the transport aircraft, etc.) to release the UAS.

The transport aircraft can be configured to dock with a distribution center, a warehouse, a shopping facility and/or other such facility to allow loading and/or unloading of packages, UASs, power sources, or the like. Similarly, the transport aircraft may dock and disengage from a carrier compartment, and reconnect with a different carrier compartment that has already been loaded with UASs and packages. While in flight, the transport aircraft can notify the scheduling control system and/or central control system of its location and/or when it is within a threshold distance of a delivery location. In some implementations, the scheduling control system can initiate communication with a customer, such as when the delivery is predicted to occur within a threshold period of time. The UASs release the product at the delivery location. In some instances, the UASs release the package at a specified area and/or into a specified delivery locker or other such structure. In some embodiments, the UAS includes one or more video cameras that can be used by the UAS in implementing the delivery (e.g., applying video analytics), and/or the video can be communicated to a UAS pilot allowing the UAS pilot to take over control of the UAS during delivery.

Once the product is released, the UAS returns to the transport aircraft (e.g., using current location information of the UAS and transport aircraft (e.g., GPS coordinates), and/or communications with the transport aircraft. In some implementations, the UASs fly directly into the carrier compartment through a bay and/or are grasped by a retrieval system. In some instances, once landed the UAS is automatically secured to the carrier compartment (e.g., one or more latches, a mechanical arm, etc.). In some instances, sensor data from the UAS and/or transport aircraft identify when the UAS is within a threshold distance and the securing mechanisms can be readied for the UAS landing. The UAS can then be secured in a storage location until re-stocked. Further, the storage location may include a charging system that can recharge one or more batteries of the UAS. A ground station and/or ground crew can be notified with the transport aircraft is returning to a ground base (e.g., distribution center, warehouse, etc.), and the ground crew and ready to reload the transport aircraft and/or replace the carrier compartment. The UASs can be placed back on a designated release system when not already stage on the release system. In some implementations, the transport aircraft 102 provides on board Wi-Fi that assists in the sharing of departure, drop off, loading, and UAS landings to the scheduling control system 104. Further, in some applications, the transport aircraft provided Wi-Fi can also be extended through the deployment of multiple UASs to establish a network of Wi-Fi hotspots for rural and/or devastated areas (e.g., due to weather destruction, human destruction, etc.).

Some embodiments provide a transport aircraft that houses UASs to be deployed to delivery packages, and in some implementations return to the transport aircraft. The UAS can be deployed from the transport airship through one or more systems, such as a rail release system, freefall, crane system, catapult, and/or other such methods. Further, the UAS may be recovered, for example, by the UAS flying back into a bay, being retrieved by a gripping system, and/or other such methods. The UAS may activate motors and propellers prior to launch (e.g., to be flown out of the carrier compartment, while suspended from a crane system, etc.). A ground station may monitor and provide at least some control of the transport aircraft and/or the UAS, such as through relays of video from the transport aircraft and/or UASs. In some implementations, one or more UAS pilots may be stationed on the transport aircraft to control the UAS in the event of an emergency, error conditions, and other problems. Further, the UAS pilots may further control the UAS during portions of the UAS flight or through the entire flight. In some embodiments, the transport aircraft and/or UAS may provide mobile Wi-Fi for the UAS and/or individuals on the ground.

In some embodiments, the transport aircraft 102 provides an autonomous aerial launching point and pick up point of UASs. This can enable the range of UAS delivery to vastly increased, and/or improve the speed of at least some deliveries. Further, the transport aircraft, in some implementations, can assist in disaster relief by quickly transporting and distributing products to individuals, communities, stores and the like. In some applications, the transport aircraft 102 can establish a Wi-Fi to places that do not usually have that capability or are incapable of having Wi-Fi, including during disaster relief. For example, the UASs can be launched with Wi-Fi base station relays that can act as a Wi-Fi base station to receive and transmit wireless communication to individual electronic devices, and relay communicates to and from the transport aircraft that can provide greater bandwidth communicate (e.g., via satellite communication, cellular communication, and/or other such communication).

Some embodiments provide gas-filled aerial transport and launch system of UASs. In some embodiments the aerial transport and launch system comprises: a transport aircraft comprising: a gas chamber; and carrier compartment that is secured with the gas chamber such that the gas chamber induces a lifting force on the carrier compartment; at least one propulsion system that causes the transport aircraft to move through the air; and a navigation control system that controls the direction of travel of the transport aircraft; wherein the carrier compartment comprises: an UAS storage area configured to receive multiple UASs staged to be launched in delivering products; and an UAS launching bay that enables the UAS to be launched while the transport aircraft is in flight and while the UAS is carrying a package to be delivered to an intended corresponding delivery location that is within a UAS flight threshold from a location of the transport aircraft at the time the UAS is launched.

Further, some embodiments provide methods of aerially transporting and launching UASs, comprising: carrying multiple UASs within a UAS storage area of a carrier compartment that is cooperated with a gas chamber of a transport aircraft, wherein the gas chamber induces a lifting force; and launching each of the multiple UASs through a UAS launching bay while the transport aircraft is in flight and while the UAS is carrying a package to be delivered to an intended corresponding delivery location that is within a UAS flight threshold from a location of the transport aircraft at the time the UAS is launched.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A gas-filled aerial transport and launch system of unmanned aircraft systems (UAS), comprising:
   a transport aircraft comprising:
      a gas chamber;
      a carrier compartment that is secured with the gas chamber such that the gas chamber induces a lifting force on the carrier compartment;
      at least one propulsion system that causes the transport aircraft to move through the air; and
      a navigation control system that controls the direction of travel of the transport aircraft;
   wherein the carrier compartment comprises:
      an UAS storage area configured to receive multiple UASs staged to be launched in delivering products; and
      an UAS launching bay that enables each of the multiple UASs to be launched while the transport aircraft is in flight and while the UAS is carrying a package to be delivered to an intended corresponding delivery location that is within a UAS flight threshold from a location of the transport aircraft at the time the UAS is launched;
   a package attaching system that automatically receives and attaches at least one package with a UAS prior to the UAS being launched; and
   a package identifier system positioned to detect a package identifier of each package cooperated with a UAS, and a respective flight path that each UAS is to travel in delivering each package is obtained based on the package identifier, and cause each of the flight paths to be communicated to a corresponding one of the UASs with which each package is cooperated.

2. The system of claim 1, wherein the carrier compartment comprises a coupling system that removably couples with a carrier mounting of the gas chamber such that the carrier compartment removably cooperates with the gas chamber.

3. The system of claim 1, further comprising a launch staging area within an interior of the carrier compartment and proximate the launching bay such that the UASs are positioned at the launch staging area and activated to fly out of the launching bay.

4. The system of claim 3, wherein each of the multiple UASs comprises a wireless transceiver and a flight control circuit such that the flight control circuit implements flight control commands received through the transceiver from a remote pilot in flying out of the launching bay, and further takes over control in controlling the flight of the UAS in response to a release from the remote pilot to implement a flight path in delivering a package cooperated with the UAS.

5. The system of claim 1, wherein the navigation control system controls the flight of the transport aircraft to fly along a predefined flight path determined based on delivery locations corresponding to each of the packages and flight ranges of a corresponding one of the UASs as the UASs launch and return to the transport aircraft in delivering packages.

6. The system of claim 1, wherein the gas chamber further comprises a carrier mounting; and
   the carrier compartment comprises one or more coupling systems, wherein the carrier mounting is configured to removably couple with the one or more coupling systems of the carrier compartment to detachably secure the carrier compartment with the gas chamber.

7. The system of claim 1, wherein each of the multiple UASs comprises a wireless transceiver and a flight control circuit, wherein the flight control circuit of each of the UASs is configured to control the flight of the UAS in implementing a flight path to one of a plurality of wait locations after delivery of the package to await return to the transport aircraft.

8. The system of claim 1, further comprising:
   a package retrieval system positioned proximate a package storage area, and configured to retrieve packages and transport the package to the package attaching system to allow the retrieved package to be cooperated with one of the multiple UASs.

9. The system of claim 8, wherein the carrier compartment comprises rack couplers configured to couple with at least one of: multiple UAS racks each configured to be loaded with a plurality of the multiple UASs, and multiple package racks each configured to be loaded with a plurality of packages to be delivered by at least one of the UASs.

10. The system of claim 9, further comprising:
    the multiple UAS racks removably positioned within the carrier compartment and secured within the carrier compartment through coupling with at least one of the rack couplers; and
    the multiple package racks removably positioned within the carrier compartment and secured within the carrier compartment through coupling with at least one of the rack couplers.

11. The system of claim 10, further comprising:
    a UAS retrieval system positioned within the carrier compartment and configured to retrieve the UASs from one or more of the UAS racks; and
    wherein the package retrieval system is configured to retrieve the packages from one or more of the package racks, wherein each of the retrieved packages is to be cooperated with at least one of the multiple UASs for transport to the respective delivery location.

12. The system of claim 1, further comprising:
    multiple UAS racks removably positioned within the carrier compartment, wherein each of the multiple UAS racks is loaded with a plurality of the multiple UASs; and
    multiple package racks removably positioned within the carrier compartment, wherein each of the multiple package racks is loaded with a plurality of packages to be delivered by at least one of the UASs.

13. The system of claim 1, wherein the carrier compartment comprises rack couplers configured to couple with at least one of multiple UAS racks each configured to be loaded with a plurality of the multiple UASs, and multiple package racks each configured to be loaded with a plurality of packages to be delivered by at least one of the UASs, wherein the rack couplers are each configured to couple with and secure at least one of the UAS racks and the package racks within the carrier compartment.

14. A gas-filled aerial transport and launch system of unmanned aircraft systems (UAS), comprising:
    a transport aircraft comprising:
       a gas chamber;
       a carrier compartment that is secured with the gas chamber such that the gas chamber induces a lifting force on the carrier compartment;
       at least one propulsion system that causes the transport aircraft to move through the air; and
       a navigation control system that controls the direction of travel of the transport aircraft; and
    wherein the carrier compartment comprises:
       an UAS storage area configured to receive multiple UASs staged to be launched in delivering products; and an UAS launching bay that enables each of the multiple UASs to be launched while the transport aircraft is in flight and while the UAS is carrying a package to be delivered to an intended corresponding delivery location that is within a UAS flight threshold from a location of the transport aircraft at the time the UAS is launched;

wherein each of the multiple UASs comprises a wireless transceiver and a flight control circuit, wherein the flight control circuit of each of the UASs is configured to control the flight of the UAS in implementing a flight path to one of a plurality of wait locations after delivery of the package to await a remote pilot to take over flight control of the UAS to return to the UAS to the transport aircraft.

15. A gas-filled aerial transport and launch system of unmanned aircraft systems (UAS), comprising:
a transport aircraft comprising:
a gas chamber;
a carrier compartment that is secured with the gas chamber such that the gas chamber induces a lifting force on the carrier compartment;
at least one propulsion system that causes the transport aircraft to move through the air; and
a navigation control system that controls the direction of travel of the transport aircraft; and
wherein the carrier compartment comprises:
an UAS storage area configured to receive multiple UASs staged to be launched in delivering products;
an UAS launching bay that enables each of the multiple UASs to be launched while the transport aircraft is in flight and while the UAS is carrying a package to be delivered to an intended corresponding delivery location that is within a UAS flight threshold from a location of the transport aircraft at the time the UAS is launched; and
a package identifier system positioned to detect a package identifier of each package, identify that a delivery location associated with a first package of the packages is unavailable, and temporarily skip the first package in a sequence of cooperating each of the packages with one of the multiple UASs when the delivery location associated with the first package is unavailable.

16. A gas-filled aerial transport and launch system of unmanned aircraft systems (UAS), comprising:
a transport aircraft comprising:
a gas chamber;
a carrier compartment that is secured with the gas chamber such that the gas chamber induces a lifting force on the carrier compartment;
at least one propulsion system that causes the transport aircraft to move through the air; and
a navigation control system that controls the direction of travel of the transport aircraft; and
wherein the carrier compartment comprises:
an UAS storage area configured to receive multiple UASs staged to be launched in delivering products;
an UAS launching bay that enables each of the multiple UASs to be launched while the transport aircraft is in flight and while the UAS is carrying a package to be delivered to an intended corresponding delivery location that is within a UAS flight threshold from a location of the transport aircraft at the time the UAS is launched;
a package attaching system that automatically receives and attaches at least one package with a UAS prior to the UAS being launched; and
a package retrieval system positioned proximate a package storage area, and configured to retrieve packages and transport the package to the package attaching system to allow the retrieved package to be cooperated with one of the multiple UASs.

17. A gas-filled aerial transport and launch system of unmanned aircraft systems (UAS), comprising:
a transport aircraft comprising:
a gas chamber;
a carrier compartment that is secured with the gas chamber such that the gas chamber induces a lifting force on the carrier compartment;
at least one propulsion system that causes the transport aircraft to move through the air; and
a navigation control system that controls the direction of travel of the transport aircraft; and
wherein the carrier compartment comprises:
an UAS storage area configured to receive multiple UASs staged to be launched in delivering products; and
an UAS launching bay that enables each of the multiple UASs to be launched while the transport aircraft is in flight and while the UAS is carrying a package to be delivered to an intended corresponding delivery location that is within a UAS flight threshold from a location of the transport aircraft at the time the UAS is launched;
wherein the carrier compartment comprises rack couplers configured to couple with at least one of multiple UAS racks each loaded with a plurality of the multiple UASs, and multiple package racks each loaded with a plurality of packages to be delivered by at least one of the UASs, wherein the rack couplers are configured to secure the UAS racks and the package racks within the carrier compartment.

18. The system of claim 17, further comprising:
the multiple UAS racks removably positioned within the carrier compartment and secured within the carrier compartment through coupling with at least one of the rack couplers; and
the multiple package racks removably positioned within the carrier compartment and secured within the carrier compartment through coupling with at least one of the rack couplers.

19. A gas-filled aerial transport and launch system of unmanned aircraft systems (UAS), comprising:
a transport aircraft comprising:
a gas chamber;
a carrier compartment that is secured with the gas chamber such that the gas chamber induces a lifting force on the carrier compartment;
at least one propulsion system that causes the transport aircraft to move through the air; and
a navigation control system that controls the direction of travel of the transport aircraft; and
wherein the carrier compartment comprises:
an UAS storage area configured to receive multiple UASs staged to be launched in delivering products; and
an UAS launching bay that enables each of the multiple UASs to be launched while the transport aircraft is in flight and while the UAS is carrying a package to be delivered to an intended corresponding delivery location that is within a UAS flight threshold from a location of the transport aircraft at the time the UAS is launched;

multiple UAS racks removably positioned with the carrier compartment, wherein each of the multiple UAS racks is loaded with a plurality of the multiple UASs; and multiple package racks removably positioned with the carrier compartment, wherein each of the multiple package racks is loaded with a plurality of packages to be delivered by at least one of the UASs.

20. The system of claim 19, further comprising:

a UAS retrieval system positioned within the carrier compartment and configured to retrieve the UASs from one or more of the UAS racks; and a package retrieval system positioned within the carrier compartment and configured to retrieve the packages from one or more of the package racks, wherein each of the retrieved packages is to be cooperated with at least one of the multiple UASs for transport to the respective delivery location.

* * * * *